Figure 1:
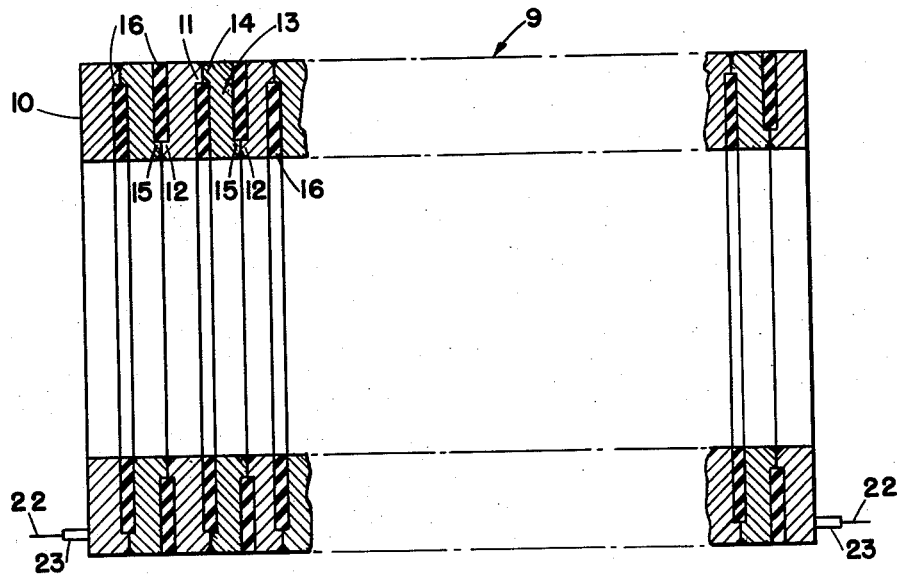

Oct. 29, 1957     E. C. LLOYD     2,811,568

THERMOPILE

Filed Oct. 11, 1946

Inventor
EDWARD C. LLOYD

By A. H. Helmerston
Attorney

United States Patent Office 2,811,568
Patented Oct. 29, 1957

2,811,568

THERMOPILE

Edward C. Lloyd, Silver Spring, Md.

Application October 11, 1946, Serial No. 702,566

2 Claims. (Cl. 136—4)

(Granted under Title 35, U. S. Code (1952), sec. 266)

This invention relates generally to means for safely transforming atomic energy directly into a useful form of power and, more specifically, to an atomic chain reaction pile, elements of which comprise means for transforming heat energy into electric energy.

It is the object of this invention to provide a novel means for converting heat energy into electric energy.

It is a further object of this invention to provide a novel means for converting the heat energy resulting from the disintegration of fissionable material to electric energy with the minimum escape of dangerous radio-active rays or substances.

It is a further object of this invention to utilize the heat energy resulting from disintegration of fissionable material for power generation at the place where such heat energy is produced.

It is a further object of this invention to convert heat energy generated by destruction of matter into electrical energy by means of theremocouples, one set of junctions of which are subject to said heat while the other set of junctions are cooled by the moderator necessary to the controlled transition of matter to energy.

It is a further object of the invention to design a thermopile of annular configuration adapted to present one set of junctions at the outer surface and the other set at the inner surface thereof.

It is a further object of the invention to design a thermopile tubular in shape with means for retarding the flow of heat through said thermopile.

The atomic disintegration of uranium, neptunium, plutonium and similar fissionable elements is accompanied by the emission of heat and radio-active radiation. This radiation renders radio-active any fluids which may be used in conveying heat generated in such material to machines for conversion into other forms of useful energy. For example, in steam generating plants using fissionable material as the primary source of power, the water and steam passing through the chain-reacting pile become radio-active and piping thereof to prime movers and auxiliary equipment endangers life and health of operating personnel. Present methods for producing continuous fission of atomic materials require the use of a moderator in association therewith. This moderator serves to slow down the neutrons emitted from the fissionable material to a velocity which will permit them to penetrate the nucleus of other atoms of the material to release more neutrons which perform in a similar manner to keep the reaction going. Heavy water is one of the moderators currently used and is the moderator used in the invention herein disclosed, but it is to be understood that any fluid moderator may be used as well as any solid moderator in a form which will serve the same purpose, as for example, a finely divided or powdered moderator with flow characteristics resembling those of fluids. Powdered graphite is one of such moderators. The fissionable material is placed in tubes which are inserted in the moderator. The gist of my invention is in using thermopiles constructed in the shape of tubes for carrying the fissionable material and at the same time converting heat energy into electrical energy. The moderator serves the dual capacity of reducing the velocity of the neutrons as well as cooling one of the sets of junctions of the thermopile. By using open ended thermopiles the problem of charging the pile with the fissionable material, a dangerous process, is greatly simplified.

Figure 2:
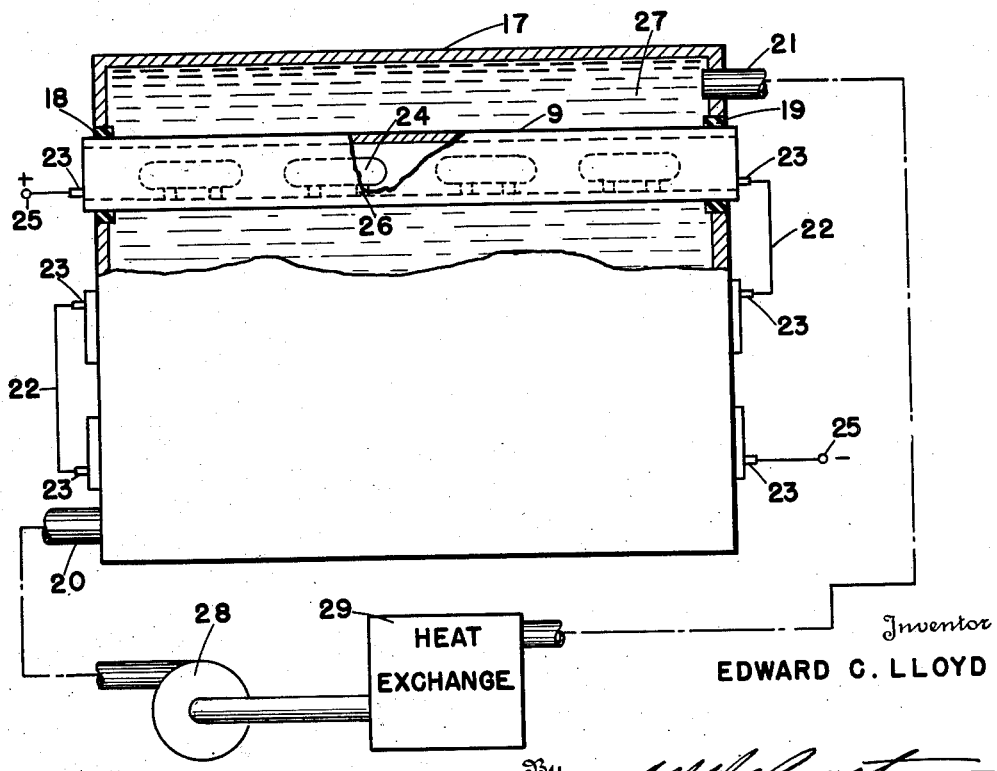

In the drawing, Figure 1 is a longitudinal cross sectional view of a thermopile used in practicing the invention. Figure 2 is a view, partially in section of the generator showing a series of thermopiles mounted in the moderator tank.

Referring more particularly to the drawings, the thermopile comprising the means for generating an electric current is disclosed in detail in Figure 1. The thermopile 9 is tubular in shape and is composed of a plurality of alternate rings or washer-shaped pieces 10 and 13 of two dissimilar metals. As is well known in the art, any two dissimilar metals will produce an electric current if one junction is at a higher temperature than the other. Antimony and constantin are examples of such metals, but others may be used, the selection taking into consideration the other physical properties entering into the operation of the atomic pile as a whole, such as specific heat, conductivity of heat, electric conductivity and resistance to the passage of neutrons.

The rings 10 are provided with a flange 11 on one face adjacent the outer edge and another flange 12 on the other face adjacent the inner edge thereof. The rings 13 are provided with flanges 14 and 15 which are positioned on opposite faces thereof similar to those of rings 10. The rings 10 and 13 are so positioned with respect to each other that the outer flanges 11 and 14 of the respective rings abut to form one junction of a thermocouple. The other flanges 12 and 15 of the two rings are joined to correspondingly positioned flanges on adjacent rings to form the other junction of the thermocouple. The abutting flanges of the several rings are preferably welded to insure proper contact therebetween and to render the thermopile composed of the thermocouples watertight.

Thermal and electric insulating material 16, such as mica, asbestos, synthetic resins, etc., is placed between the faces of the rings to prevent the cooling moderator from reaching the hot junction and to keep the heat from the cold junction and to decrease the amount of heat transferred between the inner and outer surfaces of the thermopile. The insulating material may be in the form of washers inserted at the time of assembling the metal rings 10 and 13 or it may be forced into the space between such rings after welding thereof.

As indicated in Figure 1 any number of these rings may be used to produce a tube of the length necessary to produce the voltage desired for any particular temperature differential maintained between hot and cold junctions. Reinforcing structure may be used if desired and may be in the form of tie-bolts or metal sheathing for inner and/or outer surfaces of the thermopile. The end rings are provided with electrical terminals 23.

The invention contemplates the use of the thermopiles 9 in a tank 17 composed of suitable material such as lead lined concrete, and of any desired shape. The tank is provided with aligned pairs of apertures 18 in opposite sides thereof. The thermopiles 9 extend through the tank and are supported at their ends in the apertures. Insulating packing 19 serves to insulate the thermopile from the tank and prevent leakage of the moderator. The tank is provided with an inlet pipe 20 and an outlet pipe 21 to permit circulation of the moderator to a cooling unit. As schematically shown in Figure 2, the moderator is drawn from the tank through a heat exchanging unit 29 by means of pump 28. The thermopiles, three of which are shown in Figure 2, are connected in series by conductors 22 connected to terminals 23 and power is taken off at terminals 25.

The spacing of the thermopiles 9 in the tank 17 is such that the path of the neutrons emitted by the fissionable material through the moderator is the proper length to reduce the velocity thereof to a value which will cause it to penetrate the nucleus of the atom of fissionable material. This is a design factor that must take into consideration the effect of the thermopile in decreasing the velocity of neutrons which involves radial depth of the thermopile between hot and cold junctions, diameter of the thermopile, metals used, and other factors involving a choice of design features.

In operation the tank is filled with a moderator 27, such as heavy water, which serves to permit a controlled chain reaction of certain fissionable elements. Fissionable material, such as uranium, plutonium, or neptunium, is inserted in the open end of the tubular thermopile 9. This material is shown in Figure 2 as a number of metal shapes 24, suitably spaced from the inner surface of the thermopile by spacers 26. The fissionable material emits neutrons some of which pass into the moderator which reduces the velocity of the neutrons a sufficient amount so that when they strike fissionable material, fission occurs with the accompanying release of energy. The heat thus generated serves to heat the junctions formed by flanges 12 and 15 of the rings 10 and 13.

The moderator is a necessary element of the atomic pile, serving to reduce the velocity of the neutrons to a useful value. It also performs the additional function of cooling the junctions of the thermocouples formed by flanges 11 and 14 of rings 10 and 13 respectively. As the transmission of heat through said thermopile 9 tends to heat the moderator, it is circulated through any suitable cooling means by means of outlet pipe 21 for re-entry into the tank at inlet pipe 20. In this connection it should be noted that the problem of cooling the moderator is lessened by the amount of electric energy generated and is inversely proportional to the efficiency of the thermocouple in producing electric power from the available heat energy.

While I have specifically described a preferred embodiment of the invention, it will be evident that various changes may occur to those skilled in the art without departing from the spirit and scope of the appended claims.

The invention described herein may be manufactured and used by or for the Government of the United States of America for governmental purposes without the payment of royalties therefor.

I claim:

1. A thermopile comprising alternating flat washer-type rings of dissimilar metals, each of said rings having a single flange on one face at an inner edge thereof and a single flange on the other face at the outer edge thereof, said rings having substantially the same inner and outer diameters, the outer flange of a ring axially abutting the outer flange of an adjacent ring and the inner flange of said adjacent ring axially abutting the inner flange of a ring adjacent thereto, the abutting pairs of flanges being tightly secured, the facing faces of said rings being spaced execpt at said flanges.

2. A thermopile as claimed in claim 1, and insulating material in the space between said rings except at said flanges.

References Cited in the file of this patent

UNITED STATES PATENTS

| 241,859 | Higgs | May 24, 1881 |
| 434,428 | Cox | Aug. 19, 1890 |

FOREIGN PATENTS

| 114,150 | Australia | May 2, 1940 |
| 114,151 | Australia | May 3, 1940 |
| 233,011 | Switzerland | Oct. 2, 1944 |
| 233,278 | Switzerland | Oct. 16, 1944 |

OTHER REFERENCES

Griffiths: "Methods of Measuring Temperature," pp. 61–92, 2nd Ed., Revised, Charles Griffin & Co., Ltd. (1925).

Kelly et al.: Phy. Rev. 73, 1935–9 (1943).

Business Week, pp. 57–63, Sept. 1, 1945.

Goodman: "The Science and Eng. of Nuclear Power," vol. 1, pp. 275, 387–501, Addison-Wesley (1947).

Smyth: "Atomic Power for Military Purposes," pp. 82–85 (paragraphs 7.18–7.28), 22 (paragraph 2.7).